United States Patent [19]
Hamada

[11] Patent Number: 6,144,823
[45] Date of Patent: Nov. 7, 2000

[54] IMAGE PROCESSING APPARATUS HAVING A READING APPARATUS

[75] Inventor: Tatsuo Hamada, Abiko, Japan

[73] Assignee: Canon Kabushiki Kaisha, Tokyo, Japan

[21] Appl. No.: 09/312,834

[22] Filed: May 17, 1999

[30] Foreign Application Priority Data

May 22, 1998 [JP] Japan ................................. 10-140781

[51] Int. Cl.⁷ ............................................. G03G 15/00
[52] U.S. Cl. ......................... 399/124; 358/296; 358/401; 399/1; 399/125
[58] Field of Search ................................. 399/1, 16, 21, 399/107, 110, 124, 125, 111, 361, 363; 347/138, 152; 358/474, 296, 400, 401, 498

[56] References Cited

U.S. PATENT DOCUMENTS

| | | | |
|---|---|---|---|
| 3,883,242 | 5/1975 | Takahashi et al. | 399/125 |
| 4,967,287 | 10/1990 | Nakatani | 358/401 |
| 4,969,048 | 11/1990 | Hoshino | 358/296 |
| 5,140,438 | 8/1992 | Kurahashi et al. | 358/401 |
| 5,715,500 | 2/1998 | Nakazato et al. | 399/124 |
| 5,745,246 | 4/1998 | Takaki et al. | 358/296 |
| 5,884,117 | 3/1999 | Tanoue et al. | 399/1 |

*Primary Examiner*—Sophia S. Chen
*Attorney, Agent, or Firm*—Fitzpatrick, Cella, Harper & Scinto

[57] ABSTRACT

An image processing apparatus having an image recording portion for recording an image on a sheet, and an image reading portion for reading the image of a sheet to be read, characterized in that the image reading portion is disposed in the lower portion of the image recording portion, and a sheet conveying path on the image reading portion side is disposed in a direction substantially orthogonal to a sheet conveying path on the image recording portion side.

19 Claims, 9 Drawing Sheets

IMAGE PROCESSING APPARATUS HAVING A READING APPARATUS

BACKGROUND OF THE INVENTION

1. Field of the Invention

This invention relates to an image processing apparatus such as a multifunction printer having at least an image recording portion for recording an image on a sheet, and an image reading portion for reading the image of a sheet to be read.

2. Related Background Art

With the recent spread of personal computers, the higher performance and lower prices of printers of the electrophotographic type or the ink jet type, scanners for introducing the images of photographs, documents, etc. into personal computers, or a modem which is the communication system between personal computers have progressed and the computer environment has become more and more familiar to individual users. Therefore, the present age has become such that if a printer, a scanner and a modem are connected to a personal computer, a simple copying operation and the exchange of data such as a document can be simply dealt with even in personal offices and ordinary homes.

However, the transmission of a simple document could be more efficiently accomplished if the document is transmitted by facsimile than if the images of the document are read in a personal computer one by one and then are transmitted, and if the document is to be simply copied, the use of a copying apparatus could accomplish it more quickly. However, preparing a facsimile apparatus or a copying apparatus besides a personal computer, a printer, a scanner and a modem becomes a burden in personal offices and ordinary homes in spite of their prices having become low. In addition, installation space for the products also poses a problem.

So, there has been proposed a multifunction printer as shown in FIG. 8 of the accompanying drawings wherein an operating panel or the like is provided with an image reading portion for reading images, and a communication portion for effecting the exchange of data, a ten-key/display portion, etc. is provided integrally with a printer to thereby endow the printer with the functions of a printer, a scanner, a facsimile apparatus and a copying apparatus.

In FIG. 8, a printer portion 100, which is a base, uses a compact laser beam printer most suitable for individual users. A scanner portion 200 is disposed on the openable-closable cover 301 of the printer portion 100 so that a sheet supply tray 302 on the printer portion 100 side and a sheet supply tray 303 on the scanner portion 200 side may become substantially parallel to each other, and the entire apparatus is constructed compactly. Also, the apparatus is designed such that when the mounting or dismounting of a process cartridge 101 or treatment for jam or the like is to be effected, it can be accomplished by opening the scanner portion 200 body, i.e., the openable-closable cover 301.

However, when even the above-described apparatus according to the earlier technology is used, for example, as a copying apparatus and the discharging of recording paper P from the printer portion 100 is in the direction of arrow E (face-up discharging), an original D (arrow K) discharged from the scanner portion 200 and the recording paper P (arrow E) discharged from the printer portion 100 interfere with each other as shown in FIG. 8, and in the worst case, this may sometimes cause jam. Also, if an original discharging tray 304 is provided on the scanner portion 200 in order to avoid such interference, not only does the installation space become large, but also there has been the possibility of hitching the original discharging tray 304.

Also, the scanner portion 200 is carried on the front of the apparatus body protrudingly therefrom and therefore, when the openable-closable cover 301 is opened as shown in FIG. 9 of the accompanying drawings, the scanner portion 200 strikes against the floor surface (installation surface T), and the angle of opening or closing of the openable-closable cover 301 cannot be secured sufficiently. This may constitute a hindrance during the mounting or dismounting of the process cartridge 101 or the treatment of jam or the like.

Also, the scanner portion 200 is carried on the openable-closable cover 301 and therefore, in order to support the weight thereof, the reinforcement of a hinge portion 305 constituting the center of opening-closing becomes necessary, which has become a factor of the increased cost. Also, when the openable-closable cover 301 is to be opened, it may open so as to strike against the floor surface (installation surface T) by its weight and therefore, in order to prevent this, a shock absorbing material such as a damper becomes necessary. This also has become a factor of the increased cost.

Further, as shown in FIG. 9, because the scanner portion 200 is carried on the front of the apparatus body protrudingly therefrom, not only does the apparatus look bulky in its appearances, but also it has suffered from a great limitation in its industrial design.

SUMMARY OF THE INVENTION

So, it is the object of the present invention to provide an inexpensive and compact image processing apparatus which is increased in the degree of freedom of design without spoiling its conveying property and operability.

The typical construction of the present invention for achieving the above object is an image processing apparatus having an image recording portion for recording an image on a sheet, and an image reading portion for reading the image of a sheet to be read, wherein the image reading portion is disposed in the lower portion of the image recording portion, and a sheet conveying path on the image reading portion side is disposed in a direction substantially orthogonal to a sheet conveying path on the image recording portion side.

As described above, according to the present invention, the image reading portion for reading the image of the sheet to be read is disposed in the lower portion of the image recording portion for recording the image on the sheet, and the sheet conveying path on the image reading portion side is disposed in the direction substantially orthogonal to the sheet conveying path on the image recording portion side. Therefore, for example, the jam by the interference between the sheet discharged from the image reading portion and the sheet discharged from the image recording portion can be prevented. Also, a sheet discharging tray for preventing the aforedescribed interference between the sheets becomes unnecessary and therefore, the limitation of the installation space becomes null, and the sheet discharging tray can be prevented from being hitched.

Also, the image reading portion is disposed in the lower portion of the image recording portion, and is disposed, for example, at a location which is not concerned with the opening-closing of an openable-closable cover for effecting the treatment or the like of the jam in the image recording portion. Therefore, the angle of opening or closing of the openable-closable cover can be sufficiently secured and the operability for the mounting and dismounting of a process cartridge and the treatment or the like of the jam is improved.

Further, a sheet conveying unit forming the sheet conveying path in the image reading portion is designed to be drawable out in a horizontal direction, whereby the operability for the treatment or the like of the jam not only on the image recording portion side but also on the image reading portion side is improved.

Also, the image reading portion is disposed in the lower portion of the image recording portion and nothing is carried on the aforedescribed openable-closable cover. Therefore, the reinforcement of a hinge portion for supporting its weight and a shock absorbing material for the opening and closing of the cover become unnecessary and thus, a reduction in cost becomes possible.

Further, the disposition of the image reading portion is relatively unrestricted and therefore, the degree of freedom for industrial design is increased.

DESCRIPTION OF THE PREFERRED EMBODIMENTS

Figure 1:
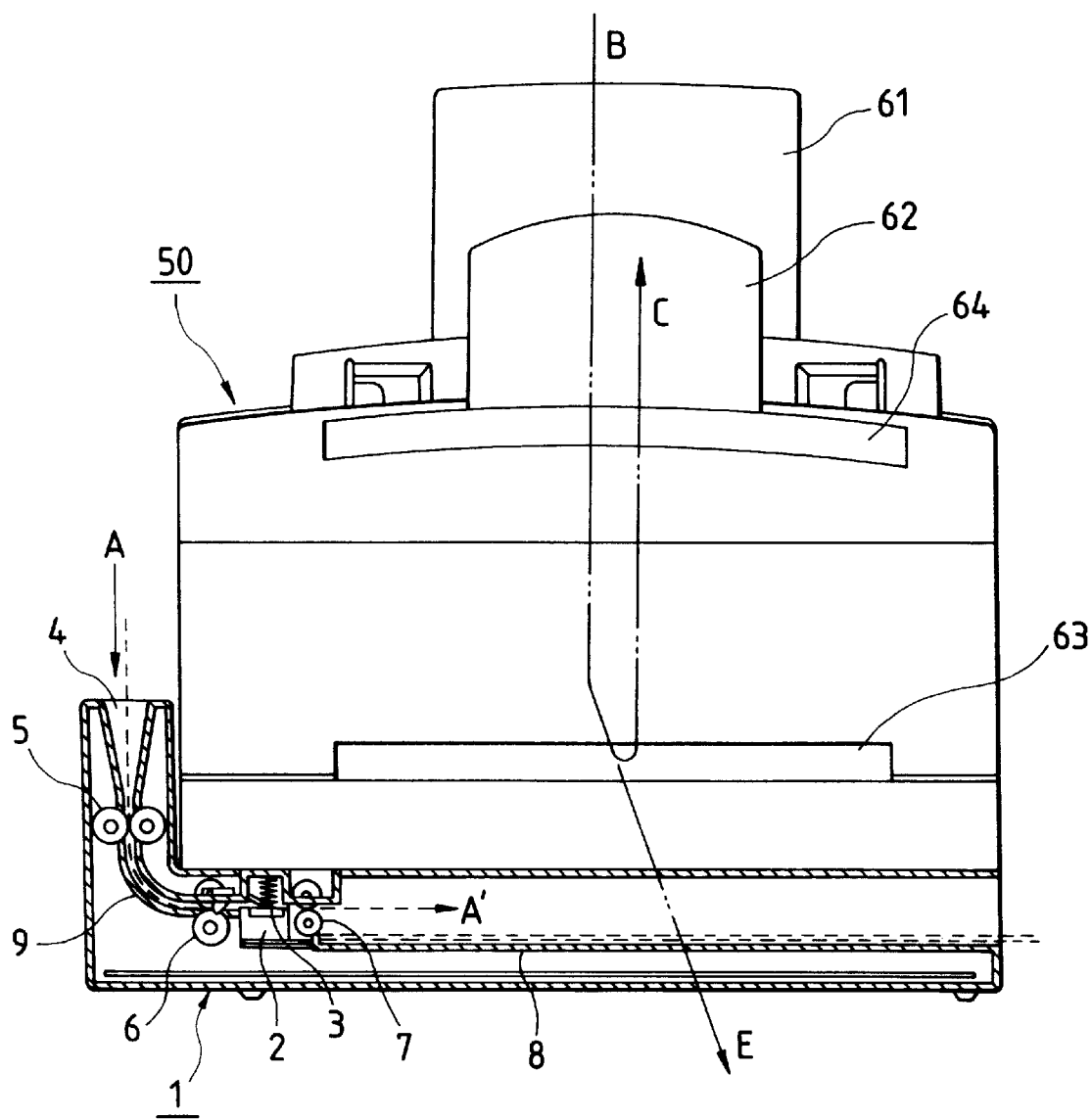
FIG. 1 is a front view of an image processing apparatus according to a first embodiment in which an image reading portion is disposed in the lower portion of an image recording portion.

Some embodiments of an image processing apparatus to which the present invention is applied will hereinafter be described with reference to the drawings.

First Embodiment

An image processing apparatus according to a first embodiment will be specifically described with reference to FIGS. 1 to 3. This image processing apparatus, as shown, is comprised of an image recording portion 50 for recording an image on a piece of recording paper P which is a sheet to be recorded, and an image reading portion 1 for reading the image of an original D which is a sheet to be read, and is provided with the functions of a printer, a scanner, a facsimile apparatus and a copying apparatus.

As the recording paper P, besides ordinary paper, use can be made of special paper such as thick paper or an envelope and a sheet such as OHP film. In the present embodiment, there is shown a case where ordinary plain paper is used. Likewise, as the original D, use can be made of various sheets, but in the present embodiment, there is shown a case where use is made of ordinary paper having an image such as a photograph or a document.

The image recording portion 50 is a recording portion of the electrophotographic type, and is designed to use a process cartridge 51 removably mountable with respect to the apparatus body. This image recording portion 50 is provided with a paper supplying tray 61 for supporting the recording paper P before image recording substantially in a longitudinal direction on the upstream side with respect to the direction of conveyance (the right side as viewed in FIG. 2). Also provided is a face-down paper discharging tray 62 for supporting the recording paper P after image recording substantially in the longitudinal direction and a face-down paper discharging port 64 on the downstream side (the left side as viewed in FIG. 2), and a face-up paper discharging port 63 for discharging the paper straight on the downstream side (the left side as viewed in FIG. 2). The changeover of the direction of paper discharge to the face-down paper discharging port 64 or the face-up paper discharging port 63 is effected by a flapper 57. The lower end portion of the paper supplying tray 61 and the lower end portion of the face-down paper discharging tray 62 are connected together by a conveying path extending from the right to left of the apparatus body to thereby constitute conveying paths B–C and B–E for the recording paper P.

The image recording portion 50 is further comprised of the process cartridge 51 comprising process means such as a photosensitive drum 51a and charging means 51b, developing means 51c and cleaning means 51d acting with the photosensitive drum 51a as a unit, a laser unit 52 for exposing the photosensitive drum 51a to image light (laser beam), a paper feeding portion 53 comprising a paper feeding roller 53a and a registration roller 53b for feeding sheets of recording paper P on the paper supplying tray 61 one by one, a transferring portion 54 for transferring an image (toner image) formed on the photosensitive drum 51a to the recording paper P, a fixating portion 55 for fixing the transferred image on the recording paper P, a face-up paper discharging roller 56 for discharging the recording paper P on which the image has been fixed in the direction of arrow E, a face-down paper discharging roller 58 for discharging the recording paper P on which the image has been fixed in the direction of arrow C, etc. The paper feeding portion 53, the process cartridge 51 and the fixating portion 55 are disposed as close as possible to one another to thereby constitute a U-shaped recording paper conveying path that is compact as a whole.

Figure 2:
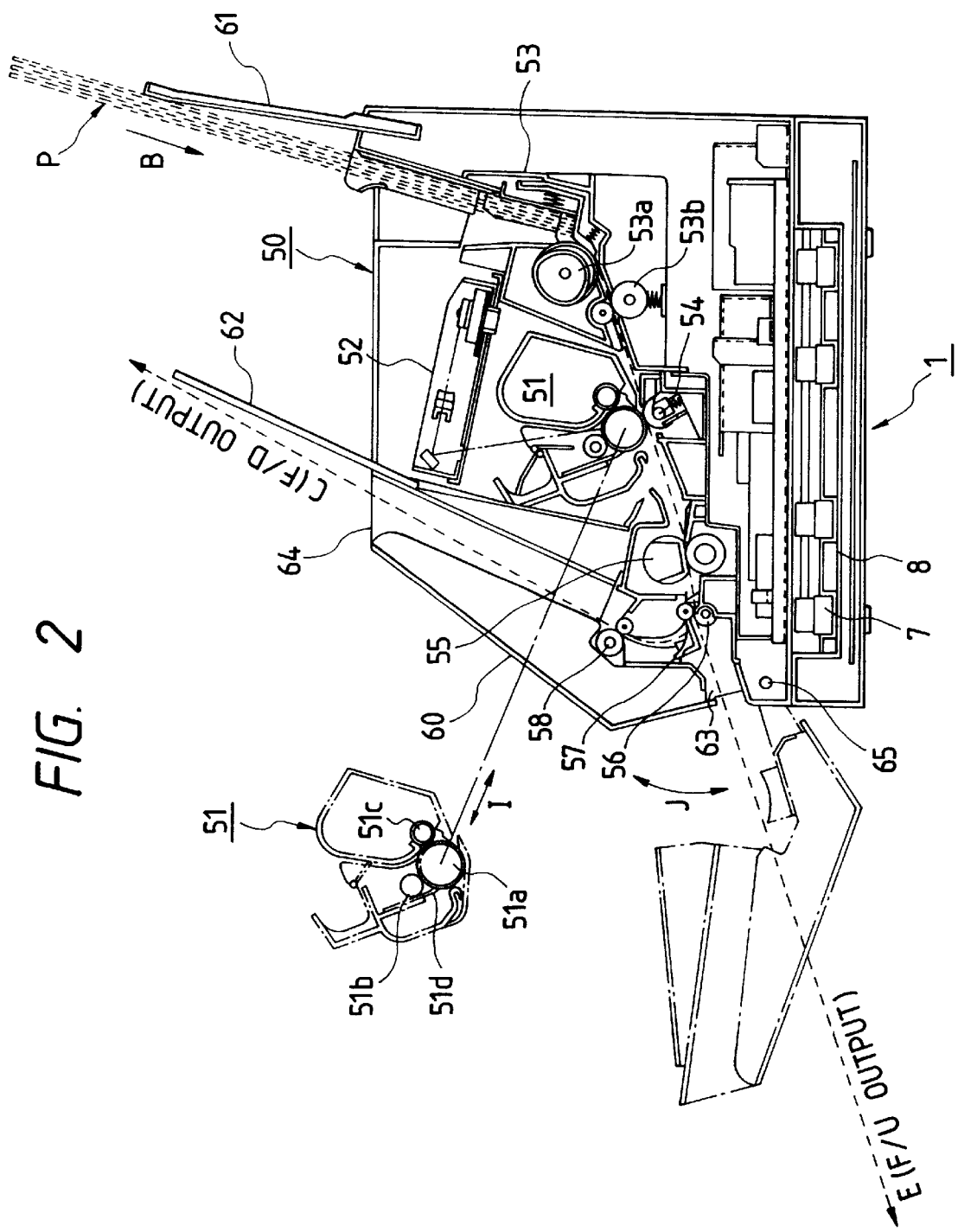
FIG. 2 is a cross-sectional view of the image processing apparatus according to the first embodiment in which the image reading portion is disposed in the lower portion of the image recording portion.

The process cartridge 51 can be mounted or dismounted by opening an openable-closable cover 60 openable and closable in the direction of arrow J to a dots-and-dash line position in FIG. 2, and drawing it out of the apparatus (a dots-and-dash line position in FIG. 2) in the direction of arrow I. Also, if the openable-closable cover 60 is opened and the process cartridge 51 is taken out, the aforedescribed recording paper conveying path will be opened and therefore, when a jam is caused, the work of fixing it can be done easily.

The image reading portion 1, as shown in FIGS. 1 and 2, is disposed below the bottom surface of the image recording portion 50, and an original conveying path A–A', as shown in FIG. 1, is constituted by an L-shaped conveying path from above the left side as viewed from the front of the image recording portion 50 to below the image recording portion 50. That is, the original D is inserted from an original supplying port 4, is downwardly conveyed by original feeding rollers 5, and is horizontally conveyed to under the image recording portion 50 by a guide portion 9. The original D is sent to an image reading sensor 2 by original conveying rollers 6 and has its image read by the image reading sensor 2 while being held down against the image reading sensor 2 by an original holding-down member 3. The original D having had its image read is then discharged onto an original discharging tray 8 located in the lower portion of the image recording portion 50 by original discharging rollers 7.

As can be seen from FIG. 1, the original conveying path A–A' in the image reading portion 1 is disposed so as to be substantially orthogonal to the recording paper conveying paths B–C and B–E in the image recording portion 50. By this construction, the recording paper conveying paths B–C and B–E in the image recording portion 50 and the original conveying path A–A' in the image reading portion 1 do not interfere with one another at all and therefore, even if, for example, the discharging of the recording paper P from the image recording portion 50 is face-up discharging (arrow E), the recording paper P will not interfere with the original D discharged from the image reading portion 1. Also, a jam which would otherwise be caused by the interference can be prevented. Further, the original discharging tray for preventing the interference between the sheets becomes unnecessary and therefore, the limitation of the installation space is eliminated and the hitching of the original discharging tray can be prevented.

Also, nothing is carried on the openable-closable cover 60 and there is no obstacle to the opening and closing. Therefore, as shown in FIG. 2, a sufficient angle of opening and closing is ensured and the operability for the mounting and dismounting of the process cartridge 51 and the treatment of jam or the like becomes good.

Further, nothing is carried on the openable-closable cover 60 and no weight is applied thereto. Thus, the reinforcement of a hinge portion 65 constituting the center of opening and closing of the openable-closable cover 60 and a shock absorbing material such as a damper become unnecessary. The image reading portion 1 can be compactly contained below the bottom surface of the image recording portion 50 and therefore, the degree of freedom of industrial design can be increased as compared with a case where the image reading portion 1 is mounted on the openable-closable cover 60.

Figure 3:
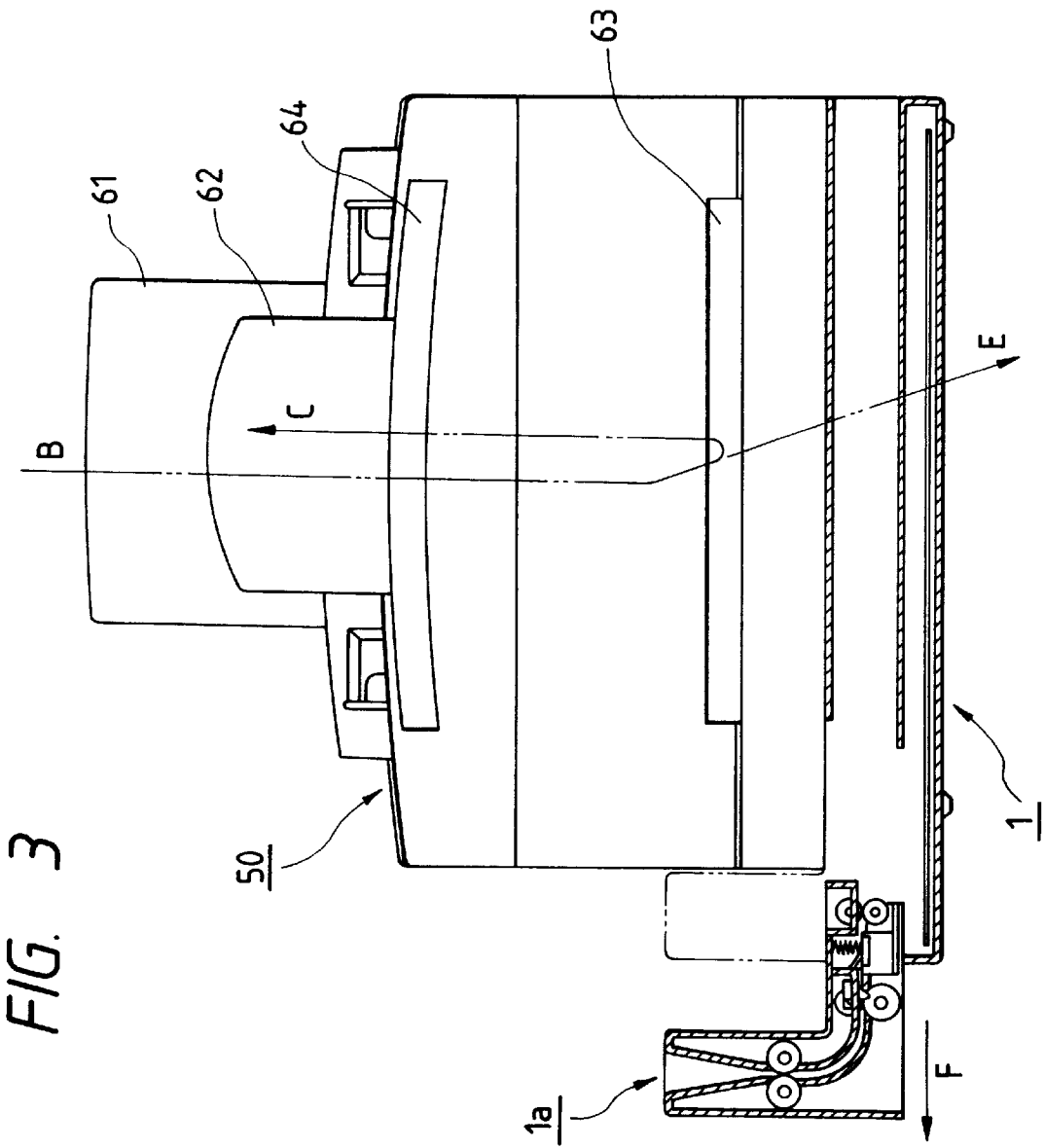
FIG. 3 is a front view showing a state in which the image reading portion has been drawn out in a horizontal direction from the image processing apparatus according to the first embodiment in which the image reading portion is disposed in the lower portion of the image recording portion.

Further, as shown in FIG. 3, an original conveying unit 1a forming the original conveying path in the image reading portion 1 is designed to be drawable out in a horizontal direction (the direction of arrow F), whereby even if jam occurs on the image reading portion 1 side, the treating work therefor can be done easily.

In the case of the above-described construction, the conveying path of the drawn-out original conveying unit 1a may be designed to be further openable. By this construction, the treating work for jam or the like can be done more easily.

Second Embodiment

An image processing apparatus according to a second embodiment will now be described specifically with reference to FIGS. 4 and 5. The schematic construction of the entire apparatus is substantially similar to that of the aforedescribed first embodiment and therefore, functionally similar members are given the same reference characters and need not be described. The features of the present embodiment will hereinafter be described.

Figure 4:
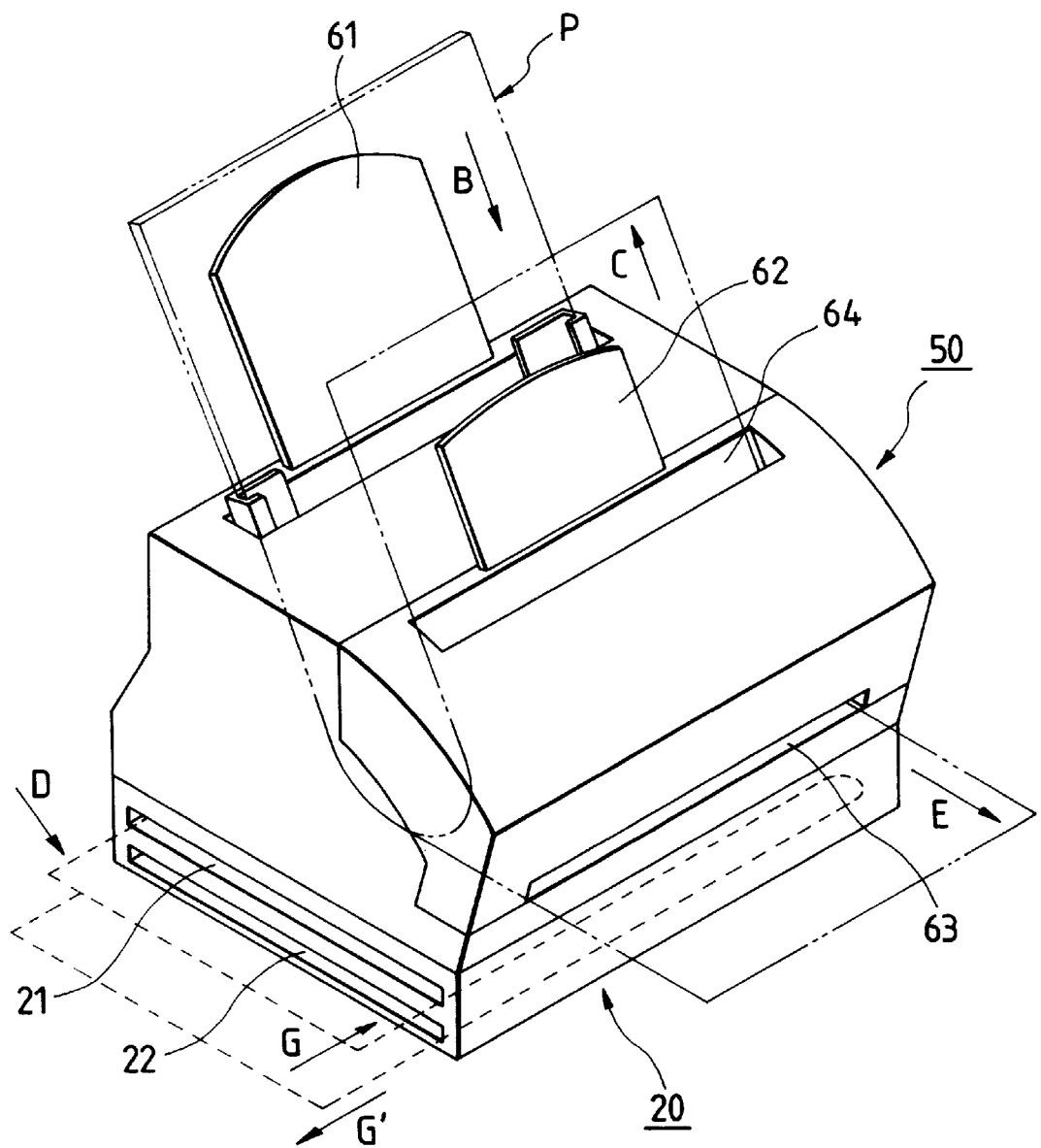
FIG. 4 is a perspective view of an image processing apparatus according to a second embodiment in which an image reading portion is disposed in the lower portion of an image recording portion.
Figure 5:
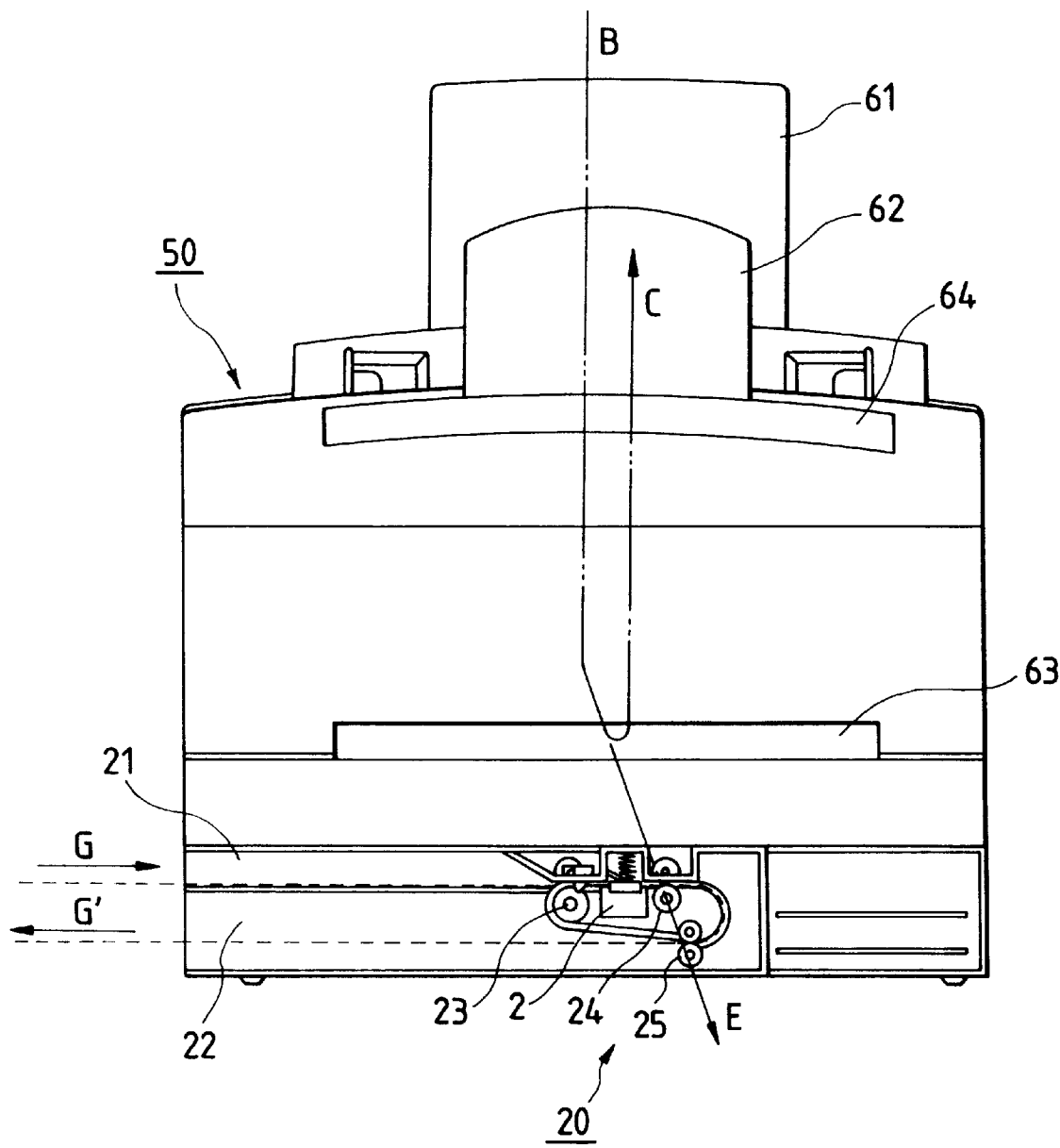
FIG. 5 is a front view of the image processing apparatus according to the second embodiment in which the image reading portion is disposed in the lower portion of the image recording portion.

In FIGS. 4 and 5, an image reading portion 20 is disposed below the bottom surface of an image recording portion 50, and a conveying path G–G' for an original D is designed to supply original D from an original supplying port 21 provided in a side of the bottom of the image recording portion 50, reverse it in the interior of the apparatus, and discharge it from an original discharging port 22 provided in the same side.

In FIG. 5, the reference numeral 23 designates an original conveying roller for conveying the original D inserted from the original supplying port 21 to an image reading sensor 2, and the reference numerals 24 and 25 denote original discharging rollers for conveying the original D having had its image read toward the original discharging port 22.

As described above, the original conveying path G–G' in the image reading portion 20 disposed below the image recording portion 50 is made into a surface-reversing conveying path, whereby the putting in and out of the original D can be done only on one side of the apparatus body and therefore, there is obtained the effect that the operability is good and the necessary installation area may be small.

Third Embodiment

An image processing apparatus according to a third embodiment will now be described specifically with reference to FIGS. 6 and 7. The schematic construction of the entire apparatus is substantially similar to that of the aforedescribed embodiments and therefore, functionally similar members are given the same reference characters and need not be described. The features of the present embodiment will hereinafter be described.

Figure 6:
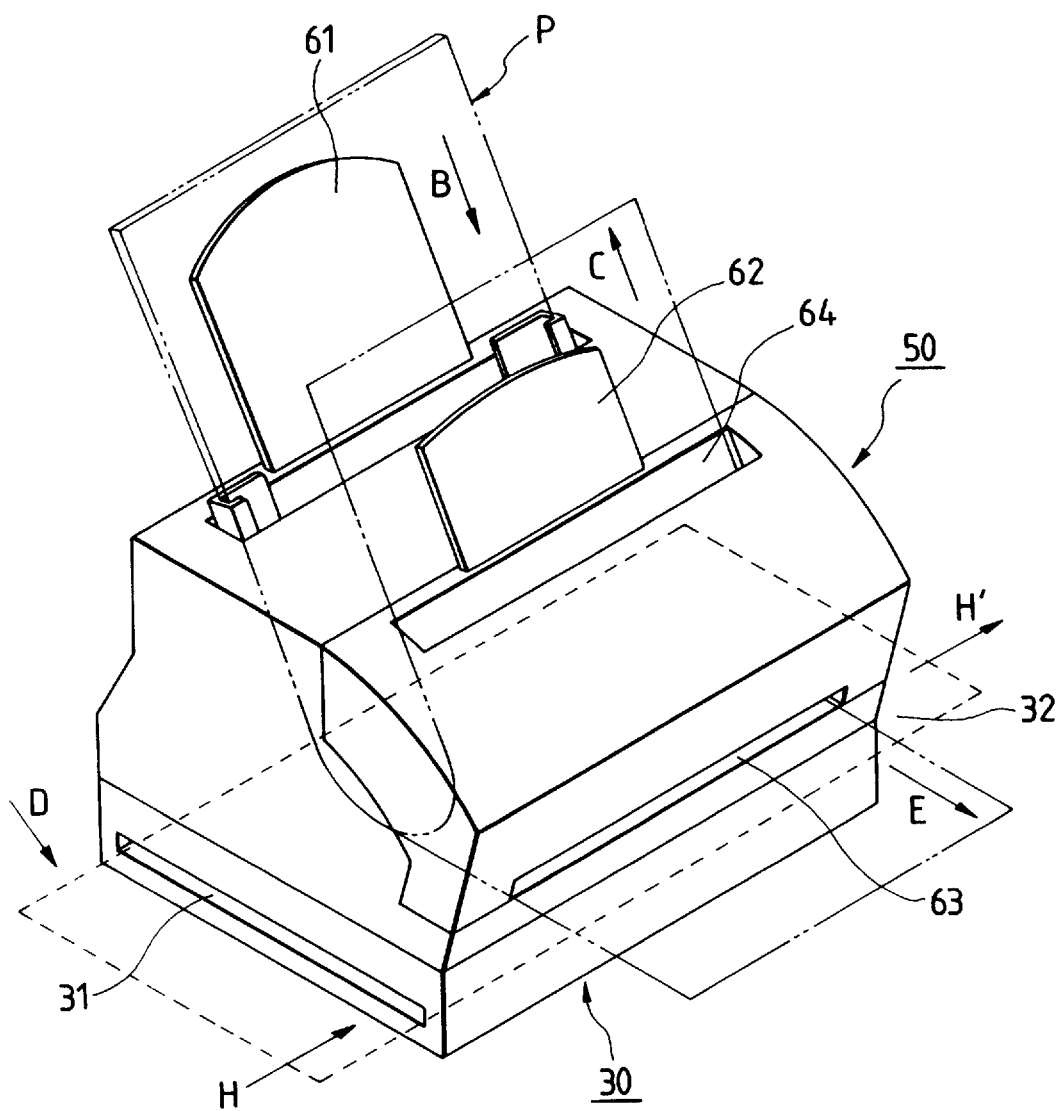
FIG. 6 is a perspective view of an image processing apparatus according to a third embodiment in which an image reading portion is disposed in the lower portion of an image recording portion.
Figure 7:
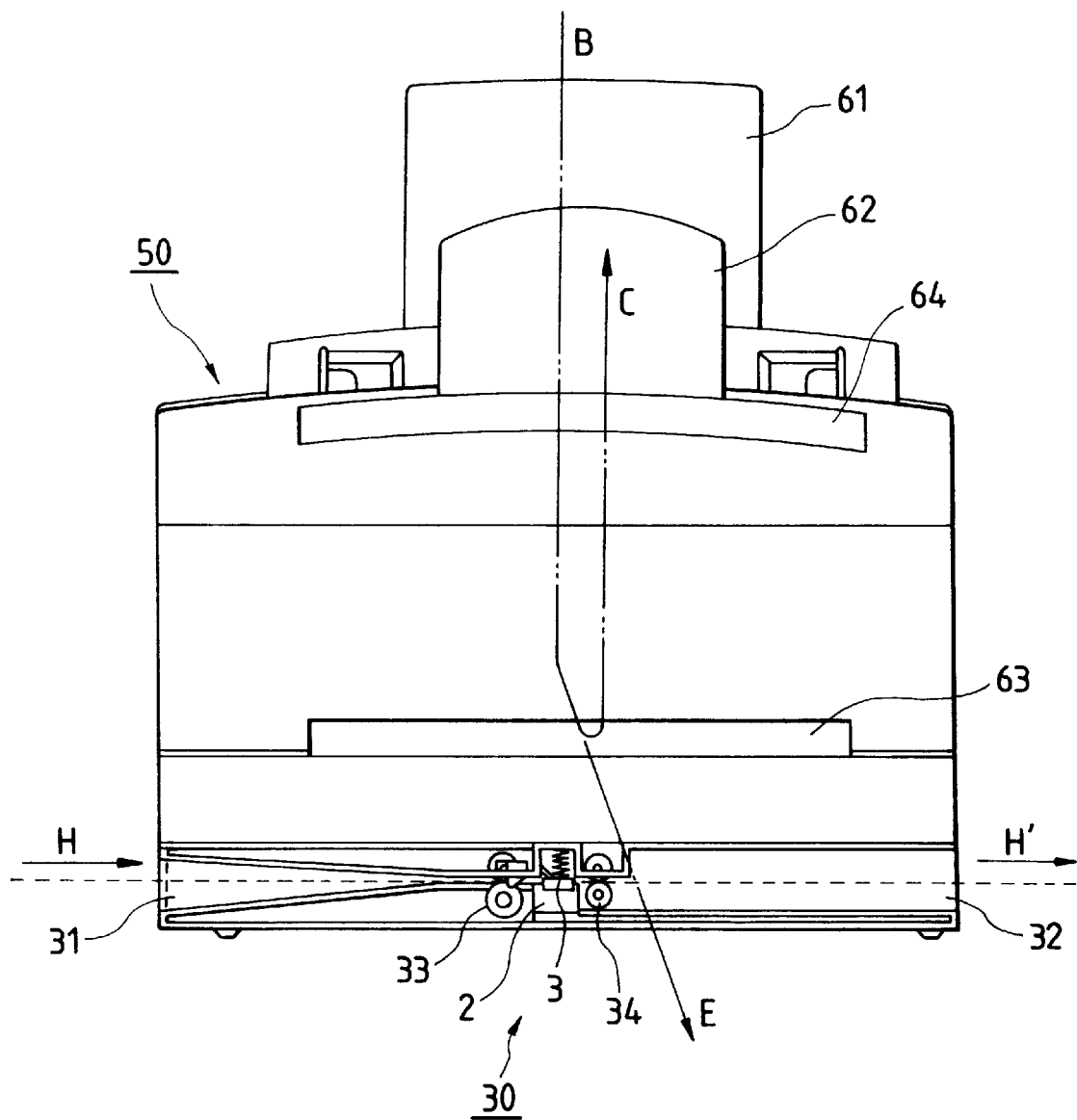
FIG. 7 is a front view of the image processing apparatus according to the third embodiment in which the image reading portion is disposed in the lower portion of the image recording portion.
Figure 8:
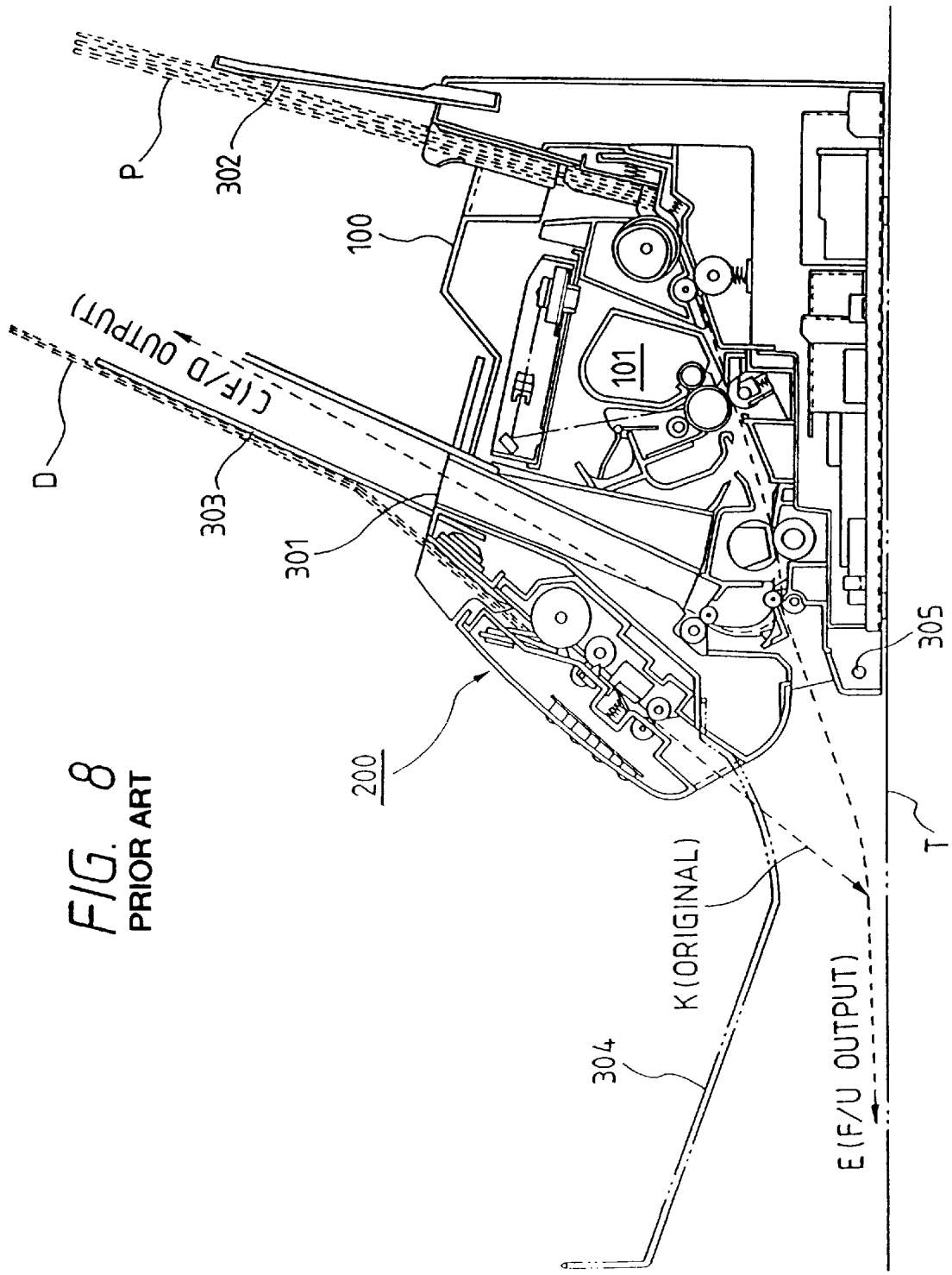
FIG. 8 is a cross-sectional view of a multifunction printer according to the earlier technology in which a scanner portion is provided on the openable-closable cover of a printer portion.
Figure 9:
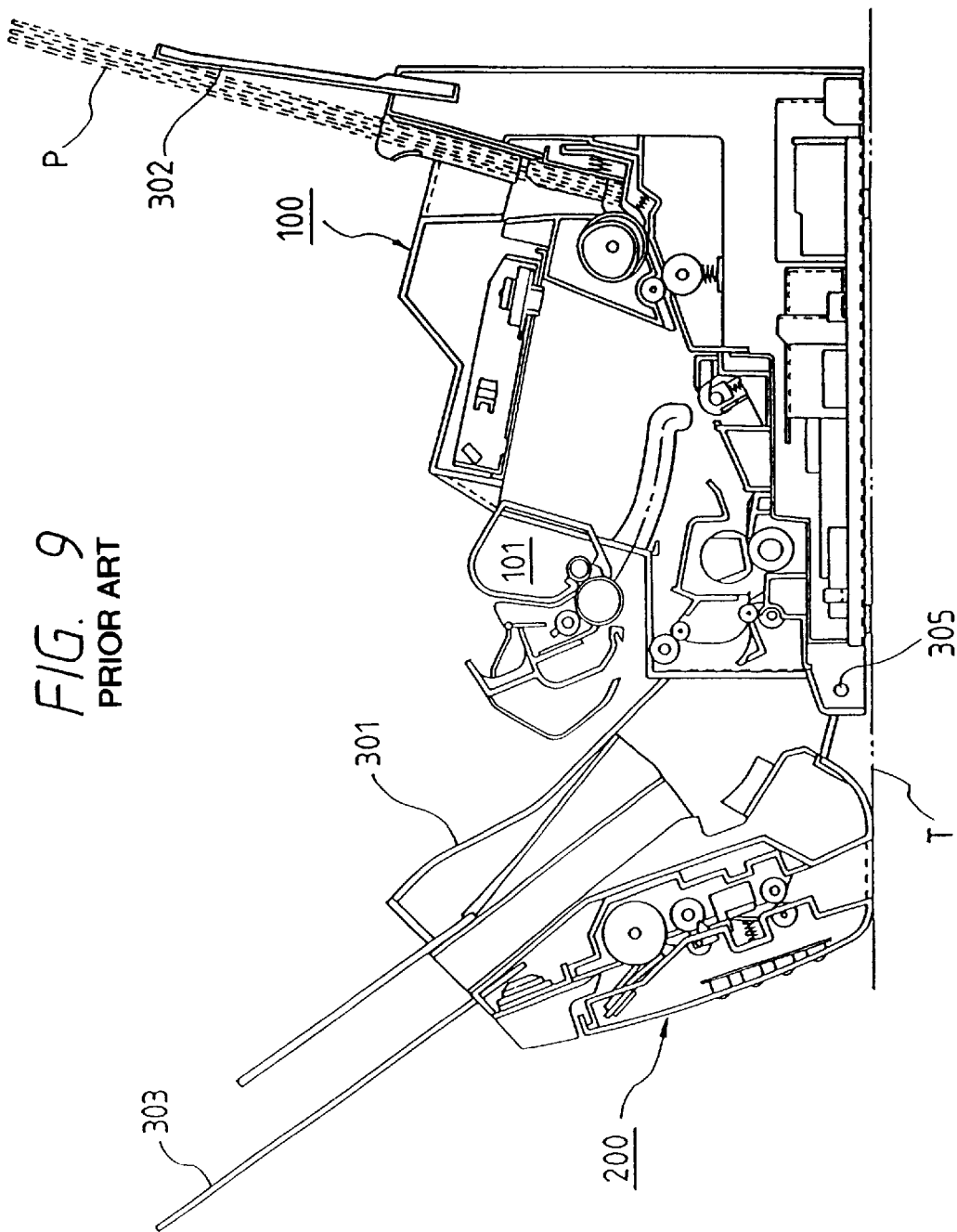
FIG. 9 is a cross-sectional view showing a case where the openable-closable cover carrying the scanner portion thereon has been opened in the multifunction printer according to the earlier technology in which the scanner portion is provided on the openable-closable cover of the printer portion.

In FIGS. 6 and 7, an image reading portion 30 is disposed below the bottom surface of an image recording portion 50, and a conveying path H–H' for an original D is designed to supply the original D from an original supplying port 31 provided in a side of the bottom of the image recording portion 50, and discharge it straight to an original discharging port 32 on the opposite side.

In FIG. 7, the reference numeral 33 designates an original conveying roller for conveying the original D supplied from the original supplying port 31 to an image reading sensor 2, and the reference numeral 34 denotes an original discharging roller for conveying the original D having had its image read toward the original discharging port 32.

As described above, the original conveying path H–H' in the image reading portion 30 disposed below the image recording portion 50 is made into a straight conveying path, whereby the image reading portion 30 can be made thin and compact with a result that a low cost is obtained. Also, if the image reading sensor portion is disposed in the central portion of the apparatus body as shown in FIG. 7, the original supplying port 31 can serve also as an original supplying tray and the original discharging port 32 can serve also as an original discharging tray and therefore, the actually used installation area may be small and a retrofitting tray or the like is unnecessary and this leads to a reduction in cost.

Other Embodiments

In the aforedescribed first embodiment, there has been shown a case where the original conveying unit 1*a* forming the original conveying path in the image reading portion 1 disposed in the lower portion of the image recording portion 50 is designed to be drawable out in a horizontal direction (the direction of arrow F in FIG. 3), and likewise in the second embodiment and the third embodiment, the original conveying units forming the original conveying paths in the image reading portions 20 and 30 may be designed to be drawable out.

Also, in the aforedescribed embodiments, the electrophotographic system has been shown as the recording system. However, this is not restrictive. The recording systems may be other recording system such as the ink jet system.

What is claimed is:

1. An image processing apparatus having an image recording portion for recording an image on a sheet to be recorded on, and an image reading portion for reading an image of a sheet to be read, the image reading portion being disposed in the lower portion of the image recording portion, and a sheet conveying path on the image reading portion side being disposed substantially orthogonal to a sheet conveying path on the image recording portion side as viewed in a direction perpendicular to a surface of a sheet in either path.

2. An image processing apparatus according to claim 1, wherein the sheet conveying path on said image reading portion side is designed to feed the sheet to be read from above the side of the image recording portion, and discharge it downwardly of the bottom surface of the image recording portion.

3. An image processing apparatus according to claim 2, wherein a sheet stacking tray is substantially uprightly disposed rearwardly of the apparatus, and a sheet discharging tray is substantially uprightly disposed forwardly of the apparatus.

4. An image processing apparatus according to claim 3, wherein a front wall including said sheet discharging tray can be opened forwardly.

5. An image processing apparatus according to claim 4, wherein a conveying path for conveying the sheet fed from said sheet stacking tray to said sheet discharging tray is provided between said sheet stacking tray and said sheet discharging tray.

6. An image processing apparatus according to claim 1, wherein the sheet conveying path on said image reading portion side is designed to feed the sheet to be read from a side of the lower portion of the image recording portion, reverse it and discharge it to the same side.

7. An image processing apparatus according to claim 6, wherein a sheet stacking tray is substantially uprightly disposed rearwardly of the apparatus, and a sheet discharging tray is substantially uprightly disposed forwardly of the apparatus.

8. An image processing apparatus according to claim 7, wherein a front wall including said sheet discharging tray can be opened forwardly.

9. An image processing apparatus according to claim 8, wherein a conveying path for conveying the sheet fed from said sheet stacking tray to said sheet discharging tray is provided between said sheet stacking tray and said sheet discharging tray.

10. An image processing apparatus according to claim 1, wherein the sheet conveying path on said image reading portion side is designed to feed the sheet to be read from a side of the lower portion of the image recording portion, and discharge it to the opposite side.

11. An image processing apparatus according to claim 10, wherein a sheet stacking tray is substantially uprightly disposed rearwardly of the apparatus, and a sheet discharging tray is substantially uprightly disposed forwardly of the apparatus.

12. An image processing apparatus according to claim 11, wherein a front wall including said sheet discharging tray can be opened forwardly.

13. An image processing apparatus according to claim 12, wherein a conveying path for conveying the sheet fed from said sheet stacking tray to said sheet discharging tray is provided between said sheet stacking tray and said sheet discharging tray.

14. An image processing apparatus according to claim 1, wherein a sheet stacking tray is substantially uprightly disposed rearwardly of the apparatus, and a sheet discharging tray is substantially uprightly disposed forwardly of the apparatus.

15. An image processing apparatus according to claim 14, wherein a front wall including said sheet discharging tray can be opened forwardly.

16. An image processing apparatus according to claim 15, wherein a conveying path for conveying the sheet fed from said sheet stacking tray to said discharging tray is provided between said sheet stacking tray and said discharging tray.

17. An image processing apparatus according to claims 16, wherein the conveying path is inclined so that a portion of the conveying path adjacent to said sheet stacking tray may be higher than other portions of the conveying path, and a photosensitive drum is disposed intermediately thereof.

18. An image processing apparatus according to claim 17, wherein a flapper is provided on said sheet discharging tray side, and the sheet can be discharged from the front with its face up by the changeover of the flapper.

19. An image processing apparatus according to any one of claims 1 to 18, wherein a sheet conveying unit forming the sheet conveying path in said image reading portion can be drawn out in a horizontal direction.

* * * * *

UNITED STATES PATENT AND TRADEMARK OFFICE
CERTIFICATE OF CORRECTION

PATENT NO. : 6,144,823                                                  Page 1 of 1
DATED : November 7, 2000
INVENTOR(S) : Tatsuo Hamada It is certified that error appears in the above-identified patent and that said Letters Patent is hereby corrected as shown below:

<u>Column 7</u>,
Line 23, "system" (first occurrence) should read -- systems --.

<u>Column 8</u>,
Line 44, "claims" should read -- claim --.

Signed and Sealed this

Thirtieth Day of October, 2001

*Attest:*

*Nicholas P. Godici*

NICHOLAS P. GODICI
*Acting Director of the United States Patent and Trademark Office*

*Attesting Officer*